United States Patent [19]

Moll

[11] Patent Number: 5,710,760
[45] Date of Patent: Jan. 20, 1998

[54] OUT-OF-BAND CONTROL FOR PERFORMING A LOOPBACK TEST FOR ASYNCHRONOUS TRANSFER MODE (ATM) NETWORKS

[75] Inventor: Keith Eugene Moll, Naperville, Ill.

[73] Assignee: Lucent Technologies Inc., Murray Hill, N.J.

[21] Appl. No.: 564,700

[22] Filed: Nov. 29, 1995

[51] Int. Cl.$^6$ .............................. H04L 1/14; H04L 12/26; H04L 12/56
[52] U.S. Cl. .......................... 370/249; 370/251; 370/397
[58] Field of Search ................................ 370/241, 248, 370/249, 250, 251, 395, 397; 375/224; 379/29

[56] References Cited

U.S. PATENT DOCUMENTS

| | | | |
|---|---|---|---|
| 4,745,593 | 5/1988 | Stewart | 370/249 |
| 5,251,204 | 10/1993 | Izawa et al. | 370/249 |
| 5,278,823 | 1/1994 | Handel | 370/249 |
| 5,313,453 | 5/1994 | Uchida et al. | 370/248 |
| 5,477,531 | 12/1995 | McKee et al. | 370/249 |
| 5,479,473 | 12/1995 | Zey | 370/249 |
| 5,563,875 | 10/1996 | Hafel et al. | 370/249 |

OTHER PUBLICATIONS

ITU-T Recommendation I.610, "B–ISDN Operation And Maintenance Principles And Functions", Mar. 1993, pp. 1–23.

Gruber, John G., "Performance And Fault Management Functions For The Maintenance Of SONET/SDH And ATM Transport Networks", Proceedings Of The International Conference on Communications, May 1993, IEEE, pp. 1308–1314.

Kanayama, Y. et al., "Virtual Path Management Functions For Broad–Band ATM Networks", Countdown To The New Milennium, Phoenix, Dec. 1991, IEEE, pp. 1401–1405.

Primary Examiner—Hassan Kizou
Attorney, Agent, or Firm—Dennis J. Williamson

[57] ABSTRACT

The loopback test consists of a user-application interface that connects the network operator to substantially all of the ATM points in the network. In operation, the network operator selects two ATM points as the loopback and source endpoints for the loopback test. The virtual path identification (VPI), virtual channel identification (VCI) and payload type indicator (PTI) that will be in the address header of the test cell when it arrives at the loopback endpoint location and the identification of the loopback endpoint are transmitted to the loopback endpoint in a setup message via a link from the UAI. The VPI, VCI and PTI that constitute the address header of a test cell injected at the source endpoint and destined for the loopback endpoint, and the location identification of the source endpoint are provided to the source endpoint in a setup message via a separate link from the UAI. The source endpoint formats a test cell based on this information and injects the cell into the network where it is routed based on the address header. The targeted loopback endpoint monitors the node identified in the setup message anticipating the arrival of the test cell. When the test cell arrives, it is captured by the loopback endpoint, examined to ensure that it is the appropriate loopback cell and retransmitted to the source endpoint.

22 Claims, 3 Drawing Sheets

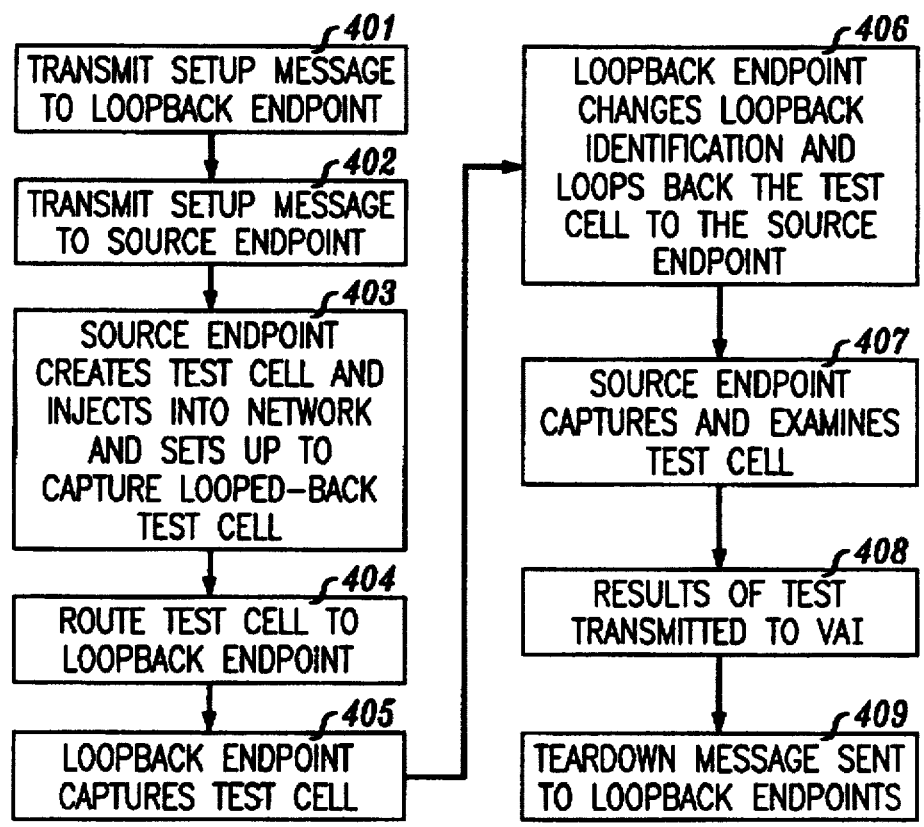

OUT-OF-BAND CONTROL FOR PERFORMING A LOOPBACK TEST FOR ASYNCHRONOUS TRANSFER MODE (ATM) NETWORKS

BACKGROUND OF THE INVENTION

The invention relates, generally, to asynchronous transfer mode (ATM) networks and, more particularly, to a system for providing an externally controlled loopback test between points in an ATM network.

It will be appreciated that ATM technology provides broadband capabilities that are suitable for transmitting video, voice and data over a single integrated network. ATM technology uses 53-octet cells to create extremely fast packet-oriented switching where multiple logical connections are multiplexed over a single physical interface. Two types of logical connections exist in ATM transmission. The first is referred to as a virtual channel connection where the virtual channel allows either a constant or variable rate flow of fixed size cells between two endpoints. The flow of cells can be either full duplex or unidirectional with reserved bandwidth in the opposite direction, for operations, administration and maintenance (OAM) purposes. The second type of connection is known as a virtual path connection where a virtual path is a bundle of virtual channels that have the same endpoints. The virtual path connection switches cells based on a virtual path identification and the virtual channel connection switches cells based both on a virtual path identification and a virtual channel identification. Because ATM technology supports enhanced network services, the use of ATM technology, is expected to grow significantly.

As the use of ATM increases, it will be necessary for network operators to efficiently operate and maintain the ATM networks. In this regard, network operators must regularly test the network to ensure that the ATM cells are being properly transmitted between ATM points in the network. It is to be understood that "ATM point" as used in this application refers to any point in the network capable of sourcing and/or sinking and processing ATM cells such as an ATM switching system, customer premise equipment such as ATM capable terminals, telephones, multimedia equipment or any other similarly capable device. One such test is a cell loopback test in which a test cell is transmitted from a first ATM point, such as an ATM switch or other ATM device, to a second ATM point where the test cell is returned or "looped-back" to the first ATM point. The first ATM point examines the looped-back cell to determine if it was the cell that was originally transmitted. If the actual looped-back test cell does not correspond to the expected test cell, the system operator knows that a routing, switching or transmission error occurred between the first and second ATM points and can take appropriate corrective action.

The existing loopback test uses an in-band control to select the first and second ATM points for the test and to control the test process. Referring to FIG. 1, the test cell of the prior art is shown including a 5 octet (in standard ATM format each octet or byte consists of eight bits) address header 11 that contains a virtual path identification (VPI), a virtual channel identification (VCI) and payload type indicator (PTI) as well as error control. The VPI, VCI and PTI comprise the header address that is used to route the cell through the network. The next octet includes four bits 12 that identify the cell as being an operations, administration and maintenance (OAM) cell and four bits 14 that identify the cell as being a loopback test cell. The following 45 octets contain the function-specific field 16. As relevant to the present invention, the function-specific field 16 contains information defining the loopback test. Specifically, the lowest order bit of the first octet of field 16 contains a loopback indication 18 and the second through fifth octets contain a correlation tag 20, such as a time stamp, specific to that test cell. It will be appreciated that the correlation tag is used to distinguish between otherwise identical test cells. The next 16 octets define the loopback location identification 22. The loopback location identification 22 defines the ATM point in the network where loop-back of the test cell is to occur; however, the content and format of the loopback location identification 22 has not been standardized. The next 16 octets define the source identification 24 of the ATM point in the network where the test cell originates. The last eight octets 26 of the 45 octets in the function-specific field 16 are unused. Finally, the penultimate 6 bits 28 of the test cell are reserved and the last 10 bits 30 of the test cell define the error detection code common to all ATM OAM cells.

To perform the loopback test of the prior art, the test cell, formatted as described above, is injected into the network at the source endpoint. As the cell is routed through the network as directed by the address header 11, it is copied by every intermediate ATM point between the source endpoint and loopback location endpoint. At every intermediate ATM point, the loopback location identification 22 is checked and if the loopback location identification does not match the intermediate ATM point identification, the test cell is discarded. At the loopback location endpoint identified in the test cell, the loopback location identification 22 in the test cell matches the location identification of the endpoint such that the test cell is looped back to the identified source endpoint.

Such a test system uses in-band control because all of the information for controlling the test (i.e. the loopback location identification, VPI, VCI and PTI) is contained within the test cell itself. One problem with in-band control is that the format and content of the test cell and, in particular, the loopback location identification 22 that is an essential part of the in-band control, has not been standardized. As a result, it is virtually impossible to conduct inter-network tests where the different networks use different formats or control protocols for the test cell. Under these conditions, the ATM points in one network will not recognize the in-band control from another network. Moreover, because the in-band control requires that the test cell be copied and examined at each intermediate ATM point to determine if the test cell is intended for that ATM point, this system uses extensive network resources during the routing of the test cell. The use of in-band control also presents security problems in that an entity other than the network operator can inject a loopback test cell into the network.

Thus, an improved loop-back test for an ATM network is desired.

SUMMARY OF THE INVENTION

The loopback test of the invention overcomes the above-noted problems of the prior art and consists of a user-application interface (UAI) that connects the network operator to substantially all of the ATM points in the network. It will be appreciated that the UAI can consist of any of the existing user-network interfaces used for general OAM purposes. In operation, the network operator selects two ATM points as the loopback endpoint and source endpoint for the loopback test. The virtual path identification (VPI), virtual channel identification (VCI) and payload type indicator (PTI) that will be in the header of the test cell when it arrives at the loopback endpoint, and the location identification of the loopback endpoint are transmitted to the loopback endpoint via a link from the UAI. The VPI, VCI and PTI that constitute the header address of a test cell injected at the source endpoint and destined for the loopback endpoint, and the location identification of the source endpoint are provided to the source endpoint via a separate link from the UAI. The source endpoint creates a test cell based on this information and injects the cell into the network where it is routed based on the header address. It will be appreciated that the virtual path connection and virtual channel connection as defined by the VPI and VCI are logical connections that define a physical path in the network. The physical path terminates at service nodes on the connected ATM points such that the source endpoint and loopback endpoint are aware of the nodes where the test cell is both transmitted and received. The location identifications are the unique identifiers given to the service nodes on the respective ATM points. Thus, the targeted loopback endpoint monitors identified node anticipating the arrival of the test cell. When the test cell arrives, it is captured by the loopback endpoint, examined to ensure that it is the appropriate loopback cell, the loopback indication is updated and the cell is retransmitted to the source endpoint. Because the control for the loopback test is out of band (i.e. the control messages are sent directly to the endpoints via the UAI rather than being incorporated in the cell), intermediate ATM points do not capture the cell thereby minimizing the amount of network resources used to perform the test. Moreover, security is enhanced because only the system operator has access to the UAI and can control the injection and loopback of a test cell. Finally, the loopback test of the invention is particularly well suited for inter-network tests because the control messages sent to the endpoints do not have to use the same protocol or format and the loopback identification does not have to be agreed on and shared by the networks.

BRIEF DESCRIPTION OF THE DRAWINGS

FIG. 3 is a table showing the standard defined value for virtual channel connections and virtual path connections;

FIG. 4 is a flow diagram illustrating operation of the system of the invention;

DETAILED DESCRIPTION OF THE INVENTION

Figure 2:
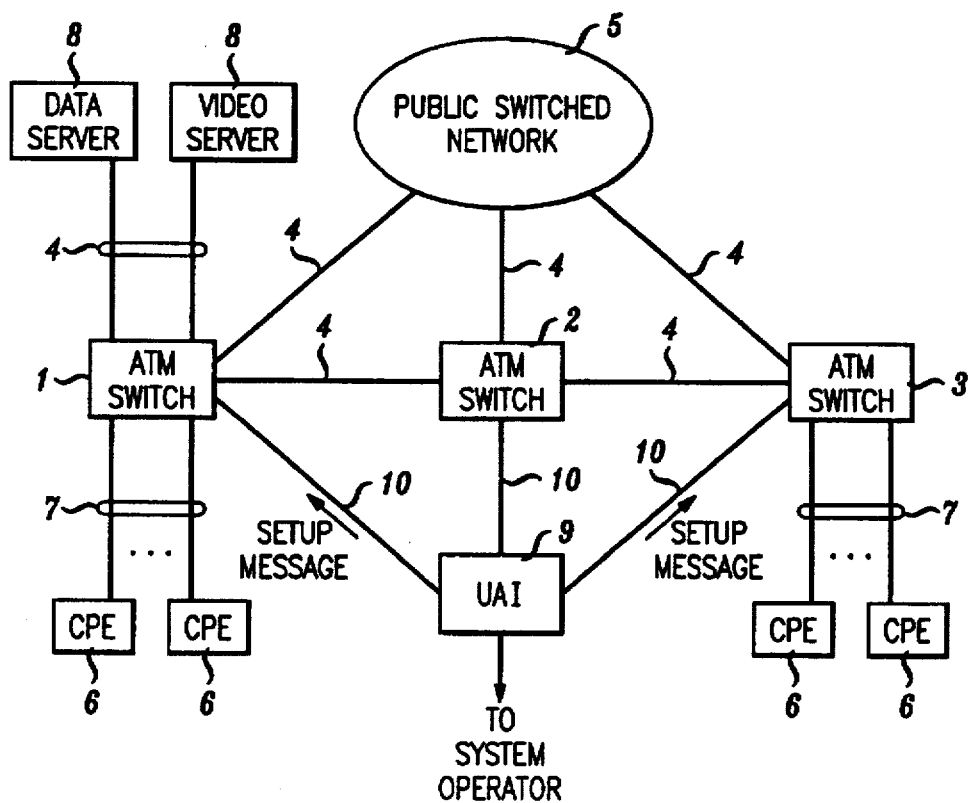
FIG. 2 is a block diagram illustrating an ATM network using the test system of the invention.

Referring more particularly to FIG. 2, a typical ATM network consists of a plurality of ATM switches 1, 2 and 3 connected to one another and to other elements in the public switched network 5 over transmission interfaces 4. The ATM switches can consist of the GCNS-2000 switch manufactured and sold by AT&T as part of the GlobeView™-2000 Broadband System or any other similar switch. ATM switches typically consist of an ATM switch fabric for routing the ATM cells, an interface for connecting the switch fabric to transmission facilities and a processor control for controlling the operation of the switch. An ATM switch constitutes one or more ATM points as that term is used in this application because it typically includes multiple elements capable of sourcing and/or sinking and processing ATM cells. It will be appreciated that an ATM point is not limited to ATM switches but includes any element in the network that can process, source, and/or sink ATM cells. The transmission interfaces 4 can consist of standard SONET/SDH (synchronous optical network) DS3, E3 interfaces or any similar transmission facility. The ATM switches are connected to customer premise equipment 6 such as personal computers, televisions, telephones, multimedia equipment or the like over wires, cables or fiber 7 and to content providers such as video and/or data servers 8 over optical or digital transmission interfaces 4. Both the CPEs 6 and servers 8 also constitute ATM points.

A user-application interface (UAI) 9 connects the system operator to each of the ATM points in the network over control links 10. The system operator can access each of the ATM points in the network via the UAI to provide Operations, Administration and Maintenance control over the network as is known in the art.

To perform the test method of the invention, the network operator sends a setup message to one of the ATM points that is to be the loopback endpoint for the particular test. The loopback endpoint is the ATM point that is to receive the test cell and loop it back to the source of the cell. Assume for purposes of explanation that ATM switch 3 is designated the loopback endpoint. The setup message sent to switch 3 over link includes the VPI and VCI that is to be contained in the test cell address header when the test cell arrives at switch 3 and that defines the service node in switch 3 that is to receive the test cell. The setup message also includes the payload type indicator (PTI). For virtual channel connections the PTI designates whether the cell is to be a segment type cell or an end-to-end type cell. It will be appreciated that these cell types are ATM standard cell types that are handled differently using different hardware at the ATM points. Thus, the PTI instructs the loopback endpoint to treat the test cell as either an end-to-end type cell or segment type cell as desired by the system operator depending upon the connections and hardware the operator wishes to test. Likewise, for virtual path connections, the VCI is used to indicate a segment or end-to-end type cell.

It will further be appreciated that the target of the loopback test can either be an standard F4 flow loopback for testing virtual path connections (VPC) or an F5 flow loopback for testing virtual channel connections (VCC). Referring more particularly to the first column of the table of FIG. 3, if a VPC is to be tested, the setup message includes the appropriate VPI (generically designated X), the VCI is either set to 3 indicating a segment type cell or to 4 indicating a end-to-end type cell and the PTI is not used. Referring to the second column of the table of FIG. 3, if a VCC is to be tested, the setup message includes the appropriate VPI (generically designated X) and VCI (generically designated Y) and the PTI is set either to 4 for a segment type cell or to 5 for an end-to-end type cell. By providing the loopback endpoint with this information, switch 3 will know whether the test is for a VCC or VPC, whether the test is for a segment type cell or an end-to-end type cell, the virtual connection and the physical location where the test cell will be received by the loopback endpoint (switch 3). Moreover, the setup message can optionally include the location identification for switch 3 where the location identification is the unique identifier given to the physical location on switch 3 where the test cell will be received. The use of the location identification will be explained in greater detail below.

Likewise, a similar setup message is sent from UAI to the source endpoint for the test cell. The source endpoint is the ATM point where the test cell is created and injected into the network. Assume for explanatory purposes that the source endpoint is switch 1. The setup message to switch 1 includes the VPI, VCI and PTI that constitute the header address of a test cell destined for the loopback endpoint, switch 3. Moreover, the location identification for switch 1 is also optionally sent to the switch in the setup message.

Figure 1:
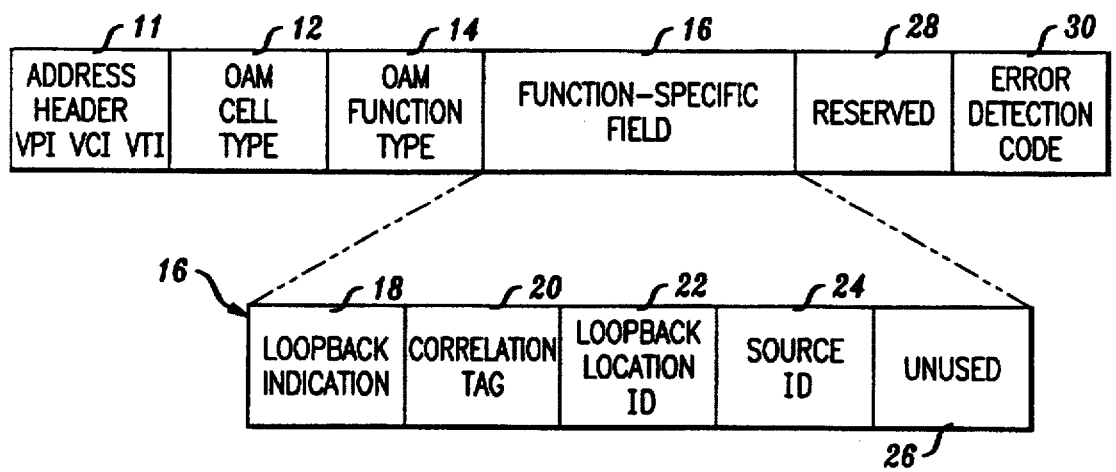
FIG. 1 is a representation of a test cell of the prior art.

When switch 1 receives the setup message it creates a test cell based on the parameters in the setup message and injects the cell into the network. To explain how the cell is created, reference will be made to FIG. 1. For explanatory purposes it will be assumed that the test request is for a virtual channel connection (VCC) (F5 flow) test. It is to be understood that the actual test is determined by the system operator and is communicated to the source endpoint in the setup message via the UAI 9. Switch 1 populates the ATM header 11 (i.e. the first 5 octets of the test cell) with the VPI and VCI it received from UAI 9 in the setup message. The next four bits 12 are populated with the standard code (0001) for identifying an OAM cell and the subsequent four bits 14 are populated with the standard code (1000) for identifying loopback function.

The next 45 bytes define the function-specific field 16. The first eight bits define the loopback indication 18. When the source endpoint (switch 1) originally creates the cell, this code is set to 00000001 indicating that the cell is to be looped back. When the loopback endpoint (switch 3) receives this cell, this byte is changed to 00000000 indicating that this test cell has been looped back and should be examined and not looped back again.

The next four bits contain a correlation tag 20 such as a time stamp or other unique identifier. The correlation tag is used to distinguish between otherwise identical test cells. For example, when a test cell is transmitted, the source endpoint will wait a predetermined time for the test cell to be looped back. If it is not received in that time, a second test cell, identical to the first except for the correlation tag, is injected into the network. If a looped-back test cell is then received by the source endpoint, it can determine which of the two originally transmitted test cells it is by the correlation tag. In standard test procedures up to three test cells are transmitted for a single test.

The next 16 bytes, used in the prior art to identify the loopback location identification 22, are not used in the test cell of the invention. Typically, these bits are populated with idle code. There is no need in the system of the invention to populate this field because the loopback endpoint has previously been selected and notified via the out-of-band setup message as previously described.

The next 16 bytes can be populated with the location identification of the source endpoint (source identification 24) or can be populated with idle code. It will be appreciated that the location identification for switch 1 differs from the location identification for switch 3. Thus, if the location identifications are used, when the test cell arrives at switch 3, the location identification in the setup message from UAI 9 to switch 3 is compared to the location identification (source identification 24) in the test cell to determine if the test cell is one that switch 3 originally sent out and should not be looped back or if it is a test cell from another ATM point that is to be looped back. Thus, the switch 3, by comparing the location identification received in the setup message to the location identification (source identification 24) in the received test cell, can ensure that it is looping back the correct cell. The comparison of location identifications is not necessary to perform the test of the invention because loopback indication 18 performs a similar function, as previously described; however, this comparison provides verification that the appropriate messages are being looped back.

Finally, the last 8 bytes of the function-specific field 16 are populated with idle code. The next 6 bits 28 of the test cell are reserved and the last 10 bits 30 include an error detection code as is known in the prior art.

After the test cell is created, it is injected into the network and is routed to the loopback endpoint (switch 3) based on the address header containing the VPI and VCI as is known in the art. Because the out-of-band control setup message is used to alert the loopback endpoint, any intermediate ATM points, such as switch 2, do not capture the test cell. The test cell is only captured when it appears at the identified service node of switch 3.

The operational steps of the test system of the invention will now be described with reference to the flow chart of FIG. 4. The system operator initiates the test either automatically or manually by sending a setup message from the UAI 9 to the desired loopback endpoint including the VPI, VCI, PTI and source identification for that endpoint (block 401). The UAI also transmits a setup message to the source endpoint including the VPI, VCI, PTI and source identification for that endpoint (block 402). The source endpoint creates a test cell based upon the setup message and injects the test cell into the network and sets up a capture routine for the looped-back test cell (block 403). The network routes the test cell to the loopback endpoint in the known manner (block 404). The loopback endpoint captures the test cell (block 405) and compares source identifications, if desired. If the test cell is to be looped back as indicated by loopback indication 18 (and the optional comparison of source identifications), the loop-back identification is changed and the cell is looped back to the source endpoint (block 406). The source endpoint captures the looped-back test cell and determines if the looped-back cell is the one that was originally sent out (block 407). The results of the test are transmitted to the UAI 9 over link 10 such that if the test cell is not received or if an incorrect cell is received, further testing and/or other remedial action can be taken by the network operator (block 408). Once the test is completed, the UAI 9 sends a teardown message to the loopback endpoint terminating the test (block 409).

Figure 5:
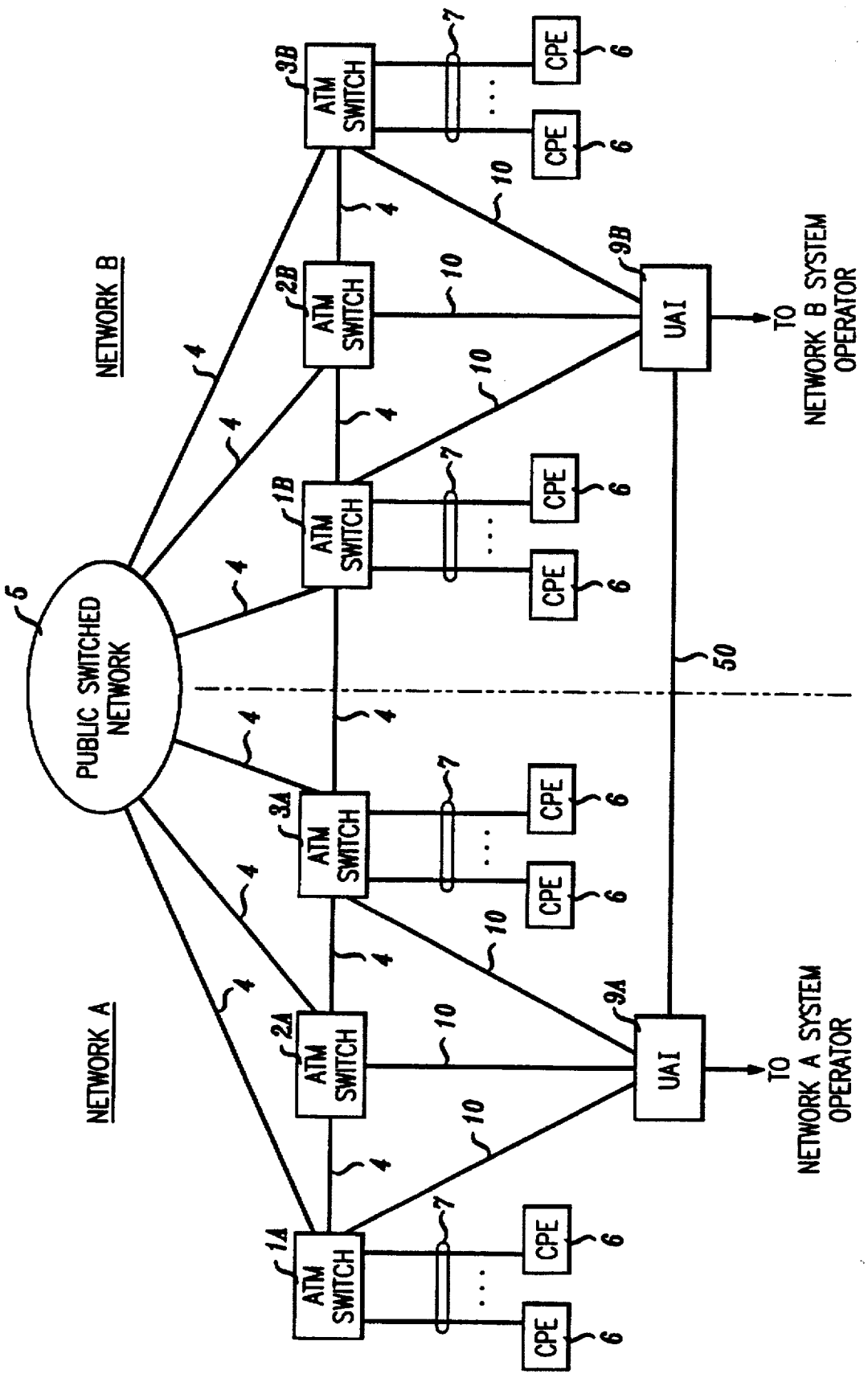
FIG. 5 is a block diagram illustrating the test system of the invention operating across networks.

Referring more particularly to FIG. 5, two independent ATM networks, Network A and Network B, are illustrated including ATM points 1A, 2A, 3A and 1B, 2B, 3B, respectively, connected to one another and to other elements in the public switched network 5 as previously described. It will be appreciated that Network A and Network B are considered separate in that they use different control protocols and/or are operated by different system operators; however, the networks allow the transmission of signals between the networks and can communicate with other elements or networks in the public switched network 5. To implement the test system of the invention across the networks, it is only necessary that Network A be able to communicate with Network B over their respective UAIs 9A and 9B, respectively, via link 50. It will be appreciated that the setup information can communicated between the networks by any other process provided that both networks have access to the setup information. To institute a loopback test between source endpoint 1A and loopback endpoint 2C a test initiation request is sent from the originating Network A UAI 9A to Network B UAI 9B over link 50 or by any other means of communication. Network B confirms the request in a message to UAI 9A and sends a setup message to the loopback endpoint 2C providing the VPI, VCI and PTI Because this setup message does not cross networks, Network B can use any message format to convey this data. Likewise, Network A sends a setup message to source endpoint 1A. The setup messages can have different formats and/or protocols provided that each are capable of conveying the control information. Because there is no need for a standard format or protocol, the system of the invention greatly facilitates inter-network testing. Once the endpoints in the two networks have received setup messages, the loopback test proceeds as previously described.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A method for controlling a loopback test between ATM points in an ATM network comprising the steps of:
   selecting one of the ATM points as a loopback endpoint;
   transmitting first address information for a test cell to said loopback endpoint;
   selecting another of the ATM points as a source endpoint;
   transmitting second address information to said source endpoint;
   creating a nest cell at said source endpoint based on said second address information and injecting said cell into said network;
   capturing said test cell at said loopback endpoint based on said first address information; and
   looping back said test cell to said source endpoint.

2. The method of claim 1, wherein said first and second address information include virtual channel identifications and virtual path identifications.

3. The method of claim 1, further including the step of transmitting payload type information to said loopback endpoint and said source endpoint.

4. The method of claim 3, wherein said payload type is either an end-to-end cell type or a segment cell type.

5. The method of claim 3, wherein the step of creating a test cell is based on said payload type information.

6. The method of claim 1, further including the step of sending a teardown message to said loopback endpoint after said test cell is received at the source endpoint.

7. The method of claim 1, further including the step of reporting the results of the test to a system operator.

8. The method of claim 1, wherein the steps of transmitting includes the step of transmitting a setup message from a user-application interface to said source endpoint and said loopback endpoint over data links.

9. The method of claim 1, further including the step of transmitting a location identification to said source endpoint and a location identification to said loopback endpoint.

10. The method of claim 1, wherein the step of looping back includes the step of validating that said test cell is to be looped back.

11. The method of claim 10, wherein the step of validating includes the step of comparing a location identification for said source endpoint to a location identification for said loopback endpoint.

12. A method for controlling a loopback test between ATM points in first and second networks comprising the steps of:
   selecting an ATM point in the first network as a loopback endpoint;
   selecting an ATM point in the second network as a source endpoint;
   providing test information to a first user-application interface in one of the first or second networks and to a second user-application interface in the other of the first or second networks;
   transmitting first address information for a test cell from said first user-application interface to said loopback endpoint;
   transmitting second address information from said second user-application interface to said source endpoint;
   creating a test cell at said source endpoint based on said address information and injecting said cell into said network;
   capturing said test cell at said loopback endpoint; and
   looping back said test cell to said source endpoint.

13. The method of claim 12, wherein said first and second address information includes virtual channel identifications and virtual path identifications.

14. The method of claim 12, further including the step of transmitting payload type information to said loopback endpoint and said source endpoint.

15. The method of claim 14, wherein said payload type is either an end-to-end cell type or a segment cell type.

16. The method of claim 14, wherein the step of creating a test cell is based on said payload type information.

17. The method of claim 12, further including the step of sending a teardown message to said loopback endpoint after said test cell is received at the loopback endpoint.

18. The method of claim 12, further including the step of reporting the results of the test to a system operator.

19. The method of claim 12, wherein the steps of transmitting includes the step of transmitting a setup message from the first user-application interface to said loopback endpoint and from said second user-application interface to said source endpoint over data links.

20. The method of claim 12, further including the step of transmitting a location identification to said source endpoint and a location identification to said loopback endpoint.

21. The method of claim 12, wherein the step of looping back includes the step of validating that said test cell is to be looped back.

22. The method of claim 21, wherein the step of validating includes the step of comparing a location identification for said source endpoint to a location identification for said loopback endpoint.

* * * * *